(12) United States Patent
Trika et al.

(10) Patent No.: US 10,884,916 B2
(45) Date of Patent: Jan. 5, 2021

(54) NON-VOLATILE FILE UPDATE MEDIA

(71) Applicant: Intel Corporation, Santa Clara, CA (US)

(72) Inventors: Sanjeev Trika, Portland, OR (US); Jawad Khan, Portland, OR (US); Peng Li, Beaverton, OR (US); Myron Loewen, Berthoud, CO (US)

(73) Assignee: Intel Corporation, Santa Clara, CA (US)

( * ) Notice: Subject to any disclaimer, the term of this patent is extended or adjusted under 35 U.S.C. 154(b) by 271 days.

(21) Appl. No.: 15/939,398

(22) Filed: Mar. 29, 2018

(65) Prior Publication Data

US 2019/0303284 A1 Oct. 3, 2019

(51) Int. Cl.
*G06F 12/02* (2006.01)
*G06F 3/06* (2006.01)
(Continued)

(52) U.S. Cl.
CPC .......... *G06F 12/0246* (2013.01); *G06F 3/061* (2013.01); *G06F 3/0604* (2013.01); *G06F 3/0622* (2013.01); *G06F 3/0647* (2013.01); *G06F 3/0659* (2013.01); *G06F 3/0679* (2013.01); *G06F 16/16* (2019.01); *G06F 16/1847* (2019.01); *G06F 21/6218* (2013.01); *G11C 13/0004* (2013.01)

(58) Field of Classification Search
CPC .. G06F 12/0246; G06F 16/16; G06F 16/1847; G06F 3/0659; G06F 21/6218; G06F 3/0679; G06F 3/0622; G06F 3/0647; G06F 3/0604; G06F 3/061; G11C 13/0004
See application file for complete search history.

(56) References Cited

U.S. PATENT DOCUMENTS

| | | | | |
|---|---|---|---|---|
| 6,324,581 | B1* | 11/2001 | Xu | H04L 29/06 709/229 |
| 8,315,995 | B1* | 11/2012 | Levy | G06F 3/0608 707/694 |
| 9,448,922 | B2 | 9/2016 | Trika et al. | |
| 2005/0251617 | A1* | 11/2005 | Sinclair | G06F 12/0893 711/103 |
| 2007/0033376 | A1* | 2/2007 | Sinclair | G06F 3/0644 711/203 |

(Continued)

OTHER PUBLICATIONS

"Power loss imminent (PLI) technology", intel.com/content/dam/www/public/us/en/documents/technology-briefs/ssd-power-loss-imminent-technology-brief.pdf, 8 pages.

(Continued)

*Primary Examiner* — Francisco A Grullon
(74) *Attorney, Agent, or Firm* — Jordan IP Law, LLC

(57) ABSTRACT

An embodiment of a mass storage apparatus may include first non-volatile media, second non-volatile media which provides a relatively larger write granularity as compared to the first non-volatile media, and logic communicatively coupled to the first and second non-volatile media to direct an access request to one of the first non-volatile media and the second non-volatile media based on an indication from an operating system. An embodiment of a host computing apparatus may include a processor, memory communicatively coupled to the processor, and logic communicatively coupled to the processor to provide an indication for a file system-related access request to a mass storage device based on a granularity size for the file system-related access request. Other embodiments are disclosed and claimed.

23 Claims, 6 Drawing Sheets

(51) Int. Cl.
*G06F 21/62* (2013.01)
*G06F 16/16* (2019.01)
*G06F 16/18* (2019.01)
*G11C 13/00* (2006.01)

(56) References Cited

U.S. PATENT DOCUMENTS

| | | | | |
|---|---|---|---|---|
| 2007/0266056 A1* | 11/2007 | Stacey | .................. | G06F 16/185 |
| 2009/0034333 A1* | 2/2009 | Garnier | ............... | G06F 12/0246 |
| | | | | 365/185.11 |
| 2009/0259798 A1* | 10/2009 | Wang | .................... | G06F 3/0661 |
| | | | | 711/103 |
| 2012/0311246 A1* | 12/2012 | McWilliams | ....... | G06F 12/0284 |
| | | | | 711/103 |
| 2013/0117503 A1* | 5/2013 | Nellans | ............... | G06F 12/0246 |
| | | | | 711/103 |
| 2013/0304978 A1* | 11/2013 | Trika | .................. | G06F 12/0246 |
| | | | | 711/103 |
| 2015/0006841 A1* | 1/2015 | Chen | .................. | G06F 13/4239 |
| | | | | 711/167 |
| 2015/0363129 A1* | 12/2015 | Watanabe | ............. | G06F 3/0619 |
| | | | | 711/114 |
| 2016/0048327 A1* | 2/2016 | Jayasena | ............. | G06F 13/1647 |
| | | | | 711/112 |
| 2017/0060436 A1 | 3/2017 | Trika et al. | | |
| 2017/0147499 A1* | 5/2017 | Mohan | .................. | G06F 3/0616 |
| 2019/0056882 A1* | 2/2019 | Feldman | ................ | G06F 3/0685 |
| 2019/0205034 A1* | 7/2019 | Mueller-Wicke | ..... | G06F 3/0605 |

OTHER PUBLICATIONS

U.S. Appl. No. 15/857,406, entitled "Mass storage device capable of fine grained read and/or write operations", filed Dec. 28, 2017, 37 pages.
U.S. Appl. No. 15/699,930, entitled "Multiple indirection granularities for mass storage devices", filed Sep. 8, 2017, 35 pages.
U.S. Appl. No. 15/703,907, entitled "An apparatus, computer program product, system, and method for managing multiple regions of a memory device", filed Sep. 13, 2017, 39 pages.
U.S. Appl. No. 15/460,043, entitled "A storage system, computer program product, and method for managing a hybrid memory device system", filed Mar. 15, 2017, 44 pages.

* cited by examiner

NON-VOLATILE FILE UPDATE MEDIA

TECHNICAL FIELD

Embodiments generally relate to storage systems. More particularly, embodiments relate to non-volatile file update media.

BACKGROUND

A computing system may include a host with a processor, system memory, and a variety of peripheral devices. Example computing systems may include personal computers such as desktop computers, laptop computers, tablet computers, etc., and enterprise computers such as servers. Many such computing systems may include connected mass storage devices such as hard disk drives (HDDs) and/or solid state drives (SSDs).

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Various embodiments described herein may include a memory component and/or an interface to a memory component. Such memory components may include volatile and/or nonvolatile memory. Nonvolatile memory may be a storage medium that does not require power to maintain the state of data stored by the medium. In one embodiment, the memory device may include a block addressable memory device, such as those based on NAND or NOR technologies. A memory device may also include future generation non-volatile devices, such as a three dimensional (3D) crosspoint memory device, or other byte addressable write-in-place nonvolatile memory devices. In one embodiment, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thiristor based memory device, or a combination of any of the above, or other memory. The memory device may refer to the die itself and/or to a packaged memory product. In particular embodiments, a memory component with non-volatile memory may comply with one or more standards promulgated by the Joint Electron Device Engineering Council (JEDEC), such as JESD218, JESD219, JESD220-1, JESD223B, JESD223-1, or other suitable standard (the JEDEC standards cited herein are available at jedec.org).

Volatile memory may be a storage medium that requires power to maintain the state of data stored by the medium. Non-limiting examples of volatile memory may include various types of RAM, such as dynamic random access memory (DRAM) or static random access memory (SRAM). One particular type of DRAM that may be used in a memory module is synchronous dynamic random access memory (SDRAM). In particular embodiments, DRAM of a memory component may comply with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4 (these standards are available at www.jedec.org). Such standards (and similar standards) may be referred to as DDR-based standards and communication interfaces of the storage devices that implement such standards may be referred to as DDR-based interfaces.

Figure 1:
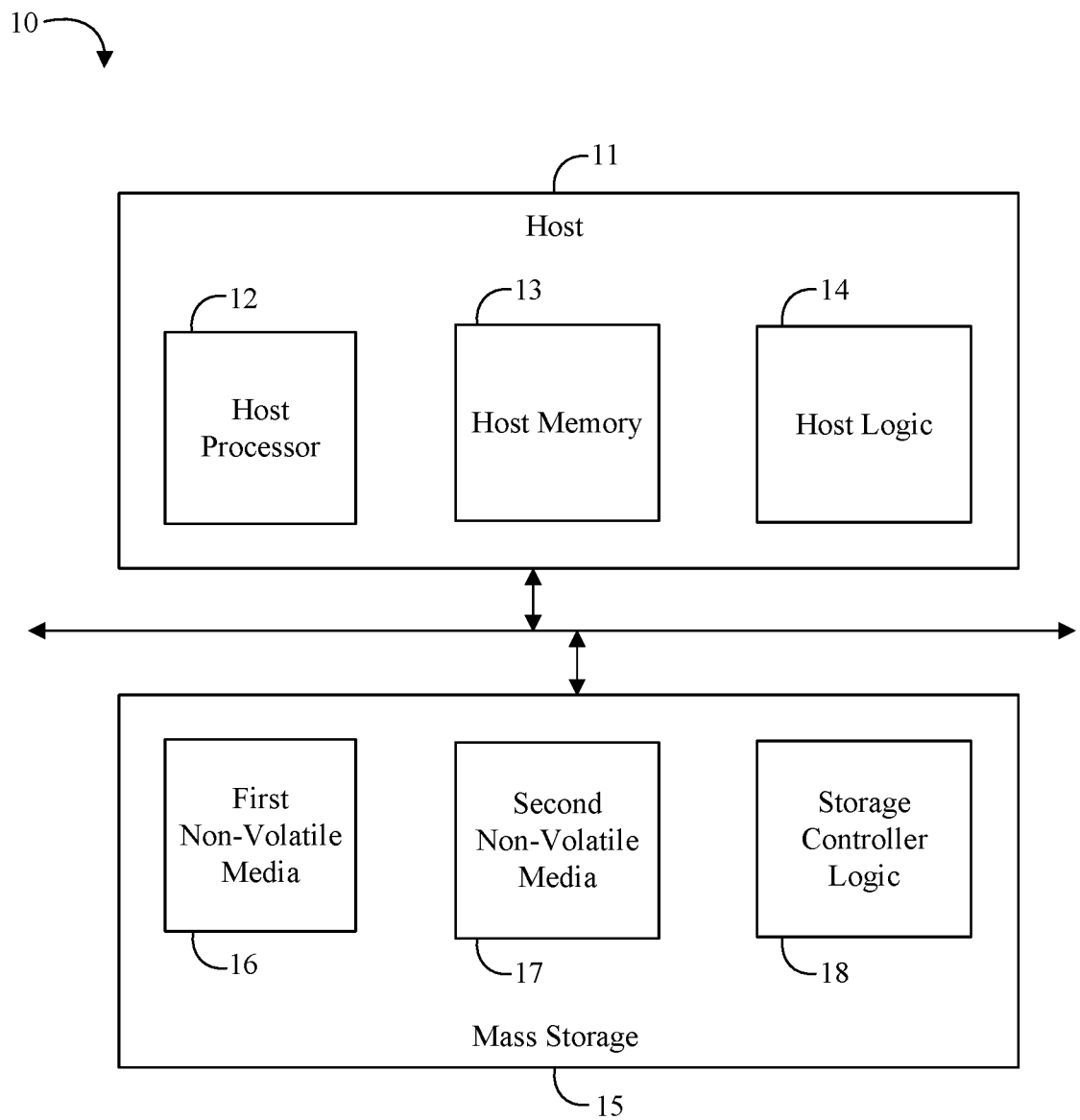
FIG. 1 is a block diagram of an example of an electronic processing system according to an embodiment.

Turning now to FIG. 1, an embodiment of an electronic processing system 10 may include a host apparatus 11 including a host processor 12, host memory 13 communicatively coupled to the host processor 12, and host logic 14 communicatively coupled to the host processor 12, and a mass storage device 15 communicatively coupled to the host apparatus 11, the mass storage device 15 including first non-volatile media 16, second non-volatile media 17, and storage controller logic 18 communicatively coupled to the first and second non-volatile media 16, 17. For example, the second non-volatile media 17 may provide a relatively larger write granularity as compared to the first non-volatile media 16. In some embodiments, the host logic 14 may be configured to provide an indication for a file system-related access request to the mass storage device 15 based on a granularity size for the file system-related access request, and the storage controller logic 18 may be configured to direct an access request from the host apparatus 11 to one of the first non-volatile media 16 and the second non-volatile media 17 based on the indication from the host logic 14.

In some embodiments, the host logic 14 may be further configured to utilize the first non-volatile media 16 of the mass storage device 15 as a write-back cache. Alternatively, or additionally, the host logic 14 may be configured to provide the indication for an active file update to direct an associated write request to the first non-volatile media 16. For example, the host logic 14 may also be configured to provide the indication for metadata corresponding to the active file update to direct an associated write request to the first non-volatile media 16. In some embodiments, the host logic 14 may also be configured to determine if a file close event corresponds to data previously directed to the first non-volatile media 16 of the mass storage device 15, and provide an indication to the mass storage device 15 to move the data associated with the closed file from the first non-volatile media 16 to the second non-volatile media 17. In some embodiments, the host logic 14 may be located in, or co-located with, various components, including the host processor 12 (e.g., on a same die).

In some embodiments, the storage controller logic 18 may be configured to provide a byte granularity input/output (IO) interface for the first non-volatile media 16 to an operating system (OS) of the host apparatus 11. The storage controller logic 18 may additionally, or alternatively, be configured to provide an indication in a logical to physical (L2P) translation table based on whether the access requested is directed to the first non-volatile media 16 or the second non-volatile media 17. In some embodiments, the storage controller logic 18 may be further configured to move data from the first non-volatile media 16 to the second non-volatile media 17 based on an indication from an OS of the host apparatus 11, and/or to move data from the first non-volatile media 16 to the second non-volatile media 17 based on an indication of a power transition. For example, the first non-volatile media 16 may include one or more of a capacitor backed DRAM, a capacitor backed SRAM, and a PCM.

Embodiments of each of the above host apparatus 11, host processor 12, host memory 13, host logic 14, mass storage device 15, first non-volatile media 16, second non-volatile media 17, storage controller logic 18, and other system components may be implemented in hardware, software, or any suitable combination thereof. For example, hardware implementations may include configurable logic such as, for example, programmable logic arrays (PLAs), field programmable gate arrays (FPGAs), complex programmable logic devices (CPLDs), or fixed-functionality logic hardware using circuit technology such as, for example, application specific integrated circuit (ASIC), complementary metal oxide semiconductor (CMOS) or transistor-transistor logic (TTL) technology, or any combination thereof.

Alternatively, or additionally, all or portions of these components may be implemented in one or more modules as a set of logic instructions stored in a machine- or computer-readable storage medium such as random access memory (RAM), read only memory (ROM), programmable ROM (PROM), firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages. For example, the host memory 13, persistent storage media, or other system memory may store a set of instructions which when executed by the host processor 12 cause the system 10 to implement one or more components, features, or aspects of the system 10 (e.g., the host logic 14, providing the indication for the file system-related access request to the mass storage device based on the granularity size for the file system-related access request, etc.).

Figure 2:
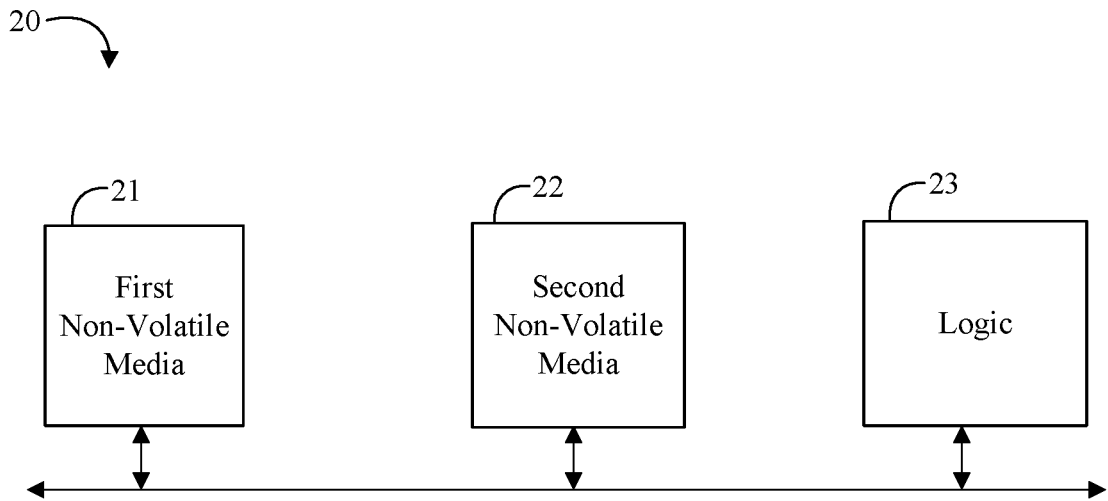
FIG. 2 is a block diagram of an example of a mass storage apparatus according to an embodiment.

Turning now to FIG. 2, an embodiment of a mass storage apparatus 20 may include first non-volatile media 21, second non-volatile media 22, where the second non-volatile media 22 provides a relatively larger write granularity as compared to the first non-volatile media 21, and logic 23 communicatively coupled to the first and second non-volatile media 21, 22 to direct an access request to one of the first non-volatile media 21 and the second non-volatile media 22 based on an indication from an OS. In some embodiments, the logic 23 may be configured to provide a byte granularity IO interface for the first non-volatile media 21 to the OS. Additionally, or alternatively, the logic 23 may be configured to provide an indication in a L2P translation table based on whether the access requested is directed to the first non-volatile media 21 or the second non-volatile media 22. In some embodiments, the logic 23 may also be configured to move data from the first non-volatile media 21 to the second non-volatile media based 22 on one or more of another indication from the OS and an indication of a power transition. For example, the first non-volatile media 21 may include one or more of a capacitor backed DRAM, a capacitor backed SRAM, and a PCM.

Embodiments of the first non-volatile media 21, the second non-volatile media 22, the logic 23, and other components of the mass storage apparatus 20, may be implemented in hardware, software, or any combination thereof including at least a partial implementation in hardware. For example, hardware implementations may include configurable logic such as, for example, PLAs, FPGAs, CPLDs, or fixed-functionality logic hardware using circuit technology such as, for example, ASIC, CMOS, or TTL technology, or any combination thereof. Additionally, portions of these components may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

Figure 3:
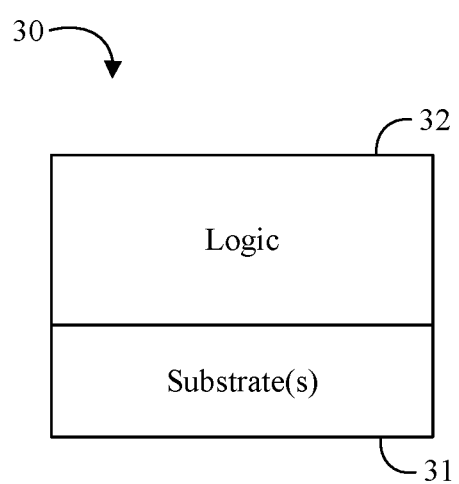
FIG. 3 is a block diagram of an example of a semiconductor apparatus according to an embodiment.

Turning now to FIG. 3, an embodiment of a semiconductor apparatus 30 may include one or more substrates 31, and logic 32 coupled to the one or more substrates 31, wherein the logic 32 is at least partly implemented in one or more of configurable logic and fixed-functionality hardware logic. The logic 32 coupled to the one or more substrates 31 may be configured to direct an access request to one of a first non-volatile media and a second non-volatile media based on an indication from an OS. In some embodiments, the logic 32 may be configured to provide a byte granularity IO interface for the first non-volatile media to the OS. Additionally, or alternatively, the logic 32 may be configured to provide an indication in a L2P translation table based on whether the access requested is directed to the first non-volatile media or the second non-volatile media. In some embodiments, the logic 32 may also be configured to move data from the first non-volatile media to the second non-volatile media based on one or more of another indication from the OS and an indication of a power transition. For example, the first non-volatile media may include one or more of a capacitor backed DRAM, a capacitor backed SRAM, and a PCM. In some embodiments, the logic 32 coupled to the one or more substrates 31 may include transistor channel regions that are positioned within the one or more substrates 31.

Embodiments of logic 32, and other components of the apparatus 30, may be implemented in hardware, software, or any combination thereof including at least a partial implementation in hardware. For example, hardware implementations may include configurable logic such as, for example, PLAs, FPGAs, CPLDs, or fixed-functionality logic hardware using circuit technology such as, for example, ASIC, CMOS, or TTL technology, or any combination thereof. Additionally, portions of these components may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

The apparatus 30 may implement one or more aspects of the method 40 (FIG. 4), or any of the embodiments discussed herein. In some embodiments, the illustrated apparatus 30 may include the one or more substrates 31 (e.g., silicon, sapphire, gallium arsenide) and the logic 32 (e.g., transistor array and other integrated circuit/IC components) coupled to the substrate(s) 31. The logic 32 may be implemented at least partly in configurable logic or fixed-functionality logic hardware. In one example, the logic 32 may include transistor channel regions that are positioned (e.g., embedded) within the substrate(s) 31. Thus, the interface between the logic 32 and the substrate(s) 31 may not be an abrupt junction. The logic 32 may also be considered to include an epitaxial layer that is grown on an initial wafer of the substrate(s) 31.

Figure 4:
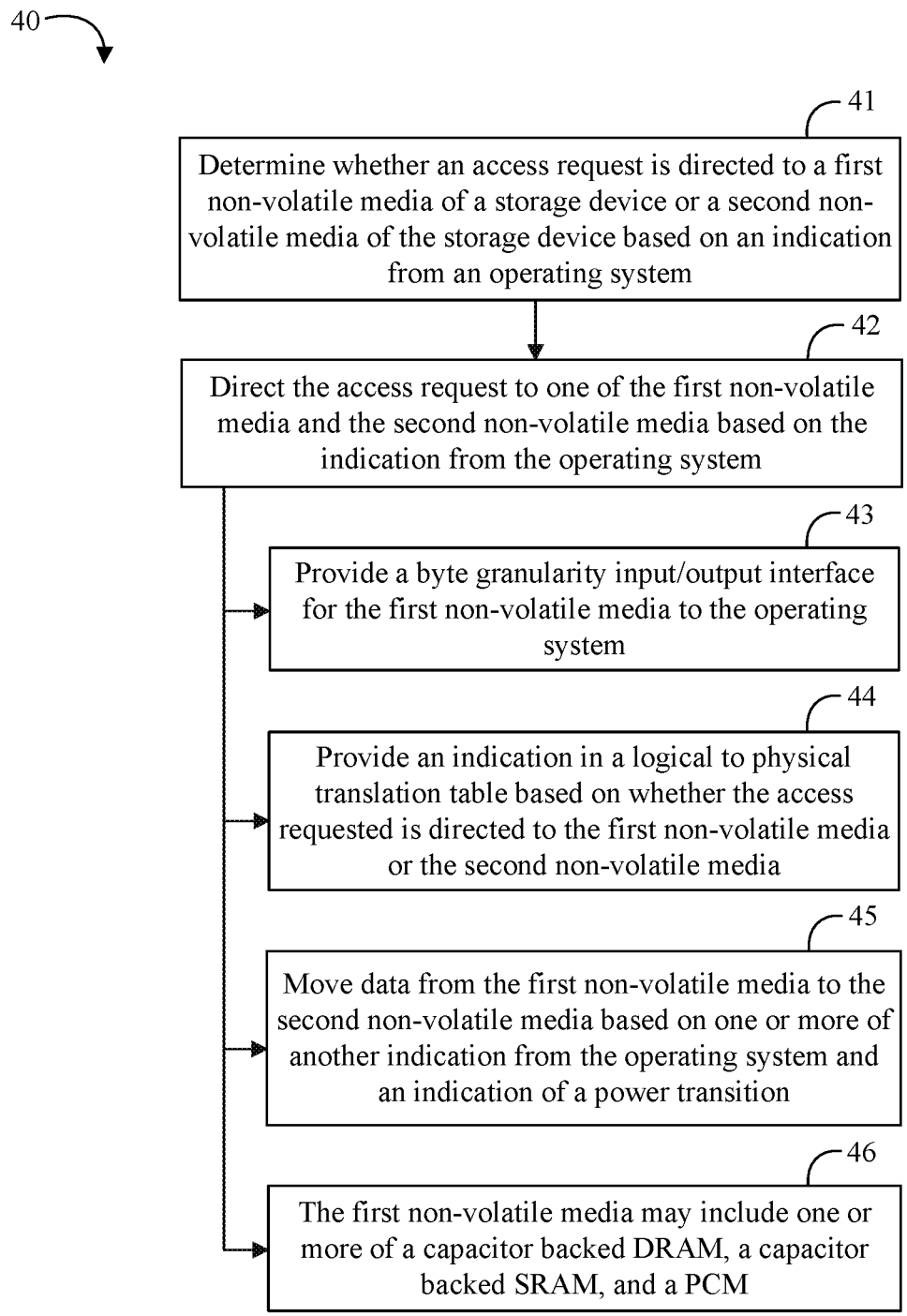
FIG. 4 is a flowchart of an example of a method of controlling storage according to an embodiment.

Turning now to FIG. 4, an embodiment of a method 40 of controlling storage may include determining whether an access request is directed to a first non-volatile media of a storage device or a second non-volatile media of the storage device based on an indication from an OS at block 41, and directing the access request to one of the first non-volatile media and the second non-volatile media based on the indication from the OS at block 42. Some embodiments of the method 40 may further include providing a byte granularity IO interface for the first non-volatile media to the OS at block 43. The method 40 may additionally, or alternatively, include providing an indication in a L2P translation table based on whether the access requested is directed to the first non-volatile media or the second non-volatile media at block 44. Some embodiments of the method 40 may also include moving data from the first non-volatile media to the second non-volatile media based on one or more of another indication from the OS and an indication of a power transition at block 45. For example, the first non-volatile media may include one or more of a capacitor backed DRAM, a capacitor backed SRAM, and a PCM at block 46.

Embodiments of the method 40 may be implemented in a system, apparatus, computer, device, etc., for example, such as those described herein. More particularly, hardware implementations of the method 40 may include configurable logic such as, for example, PLAs, FPGAs, CPLDs, or in fixed-functionality logic hardware using circuit technology such as, for example, ASIC, CMOS, or TTL technology, or any combination thereof. Alternatively, or additionally, the method 40 may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

For example, the method 40 may be implemented on a computer readable medium as described in connection with Examples 26 to 30 below. Embodiments or portions of the method 40 may be implemented in firmware, applications (e.g., through an application programming interface (API)), or driver software running on an OS.

Figure 5:
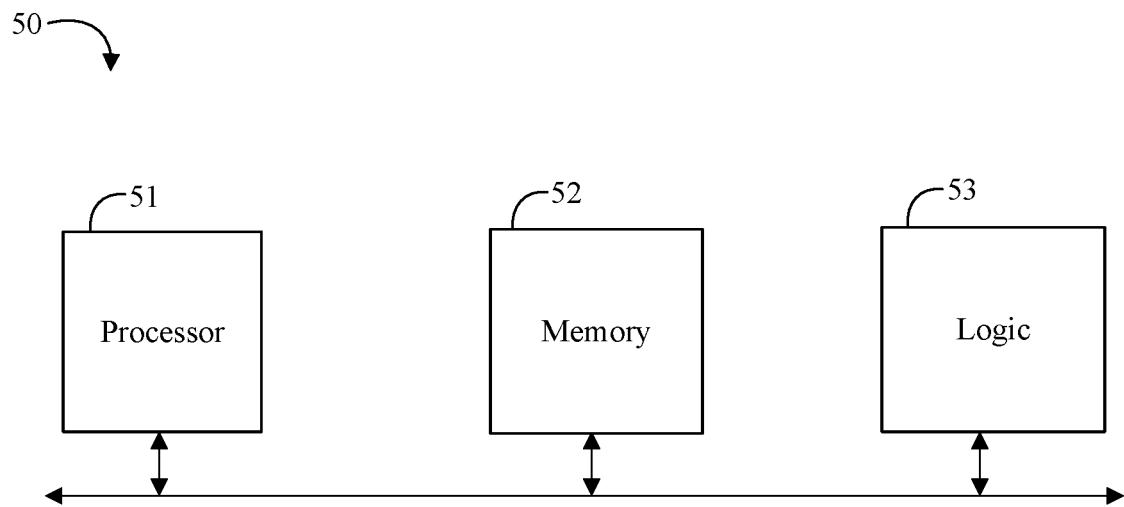
FIG. 5 is a block diagram of an example of a host computing apparatus according to an embodiment.

Turning now to FIG. 5, an embodiment of a host computing apparatus 50 may include a processor 51, memory 52 communicatively coupled to the processor 51, and logic 53 communicatively coupled to the processor 51 to provide an indication for a file system-related access request to a mass storage device based on a granularity size for the file system-related access request. In some embodiments, the logic 53 may be configured to utilize a first non-volatile media of the mass storage device as a write-back cache, and utilize a second non-volatile media of the mass storage device for other access requests, where a write granularity of the second non-volatile media of the mass storage device may be larger than a write granularity of the first non-volatile media of the mass storage device. Alternatively, or additionally, the logic 53 may be configured to provide the indication for an active file update to direct an associated write request to the first non-volatile media of the mass storage device (e.g., where a granularity of the first non-volatile media of the mass storage device may be smaller than a granularity of a second non-volatile media of the mass storage device). For example, the logic 53 may also be configured to provide the indication for metadata corresponding to the active file update to direct an associated write request to the first non-volatile media of the mass storage device. In some embodiments, the logic 53 may be further configured to determine if a file close event corresponds to data previously directed to the first non-volatile media of the mass storage device, and provide an indication to the mass storage device to move the data associated with the closed file from the first non-volatile media to the second non-volatile media.

Embodiments of the processor 51, the memory 52, the logic 53, and other components of the host computing apparatus 50, may be implemented in hardware, software, or any combination thereof including at least a partial implementation in hardware. For example, hardware implementations may include configurable logic such as, for example, PLAs, FPGAs, CPLDs, or fixed-functionality logic hardware using circuit technology such as, for example, ASIC, CMOS, or TTL technology, or any combination thereof. Additionally, portions of these components may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

Figure 6:
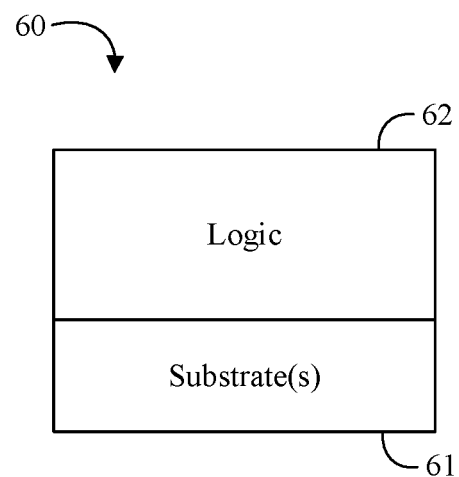
FIG. 6 is a block diagram of another example of a semiconductor apparatus according to an embodiment.

Turning now to FIG. 6, an embodiment of a semiconductor apparatus 60 may include one or more substrates 61, and logic 62 coupled to the one or more substrates 61, wherein the logic 62 is at least partly implemented in one or more of configurable logic and fixed-functionality hardware logic. The logic 62 coupled to the one or more substrates 61 may be configured to provide an indication for a file system-related access request to a mass storage device based on a granularity size for the file system-related access request. In some embodiments, the logic 62 may be configured to utilize a first non-volatile media of the mass storage device as a write-back cache, and utilize a second non-volatile media of the mass storage device for other access requests, where a write granularity of the second non-volatile media of the mass storage device may be larger than a write granularity of the first non-volatile media of the mass storage device. Alternatively, or additionally, the logic 62 may be configured to provide the indication for an active file update to direct an associated write request to the first non-volatile media of the mass storage device (e.g., where a granularity of the first non-volatile media of the mass storage device may be smaller than a granularity of a second non-volatile media of the mass storage device). For example, the logic 62 may also be configured to provide the indication for metadata corresponding to the active file update to direct an associated write request to the first non-volatile media of the mass storage device. In some embodiments, the logic 62 may be further configured to determine if a file close event corresponds to data previously directed to the first non-volatile media of the mass storage device, and provide an indication to the mass storage device to move the data associated with the closed file from the first non-volatile media to the second non-volatile media. In some embodiments, the logic 62 coupled to the one or more substrates 61 may include transistor channel regions that are positioned within the one or more substrates 61.

Embodiments of logic 62, and other components of the apparatus 60, may be implemented in hardware, software, or any combination thereof including at least a partial implementation in hardware. For example, hardware implementations may include configurable logic such as, for example, PLAs, FPGAs, CPLDs, or fixed-functionality logic hardware using circuit technology such as, for example, ASIC, CMOS, or TTL technology, or any combination thereof. Additionally, portions of these components may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

The apparatus 60 may implement one or more aspects of the method 70 (FIG. 7), or any of the embodiments discussed herein. In some embodiments, the illustrated apparatus 60 may include the one or more substrates 61 (e.g., silicon, sapphire, gallium arsenide) and the logic 62 (e.g., transistor array and other integrated circuit/IC components) coupled to the substrate(s) 61. The logic 62 may be implemented at least partly in configurable logic or fixed-functionality logic hardware. In one example, the logic 62 may include transistor channel regions that are positioned (e.g., embedded) within the substrate(s) 61. Thus, the interface between the logic 62 and the substrate(s) 61 may not be an abrupt junction. The logic 62 may also be considered to include an epitaxial layer that is grown on an initial wafer of the substrate(s) 61.

Figure 7:
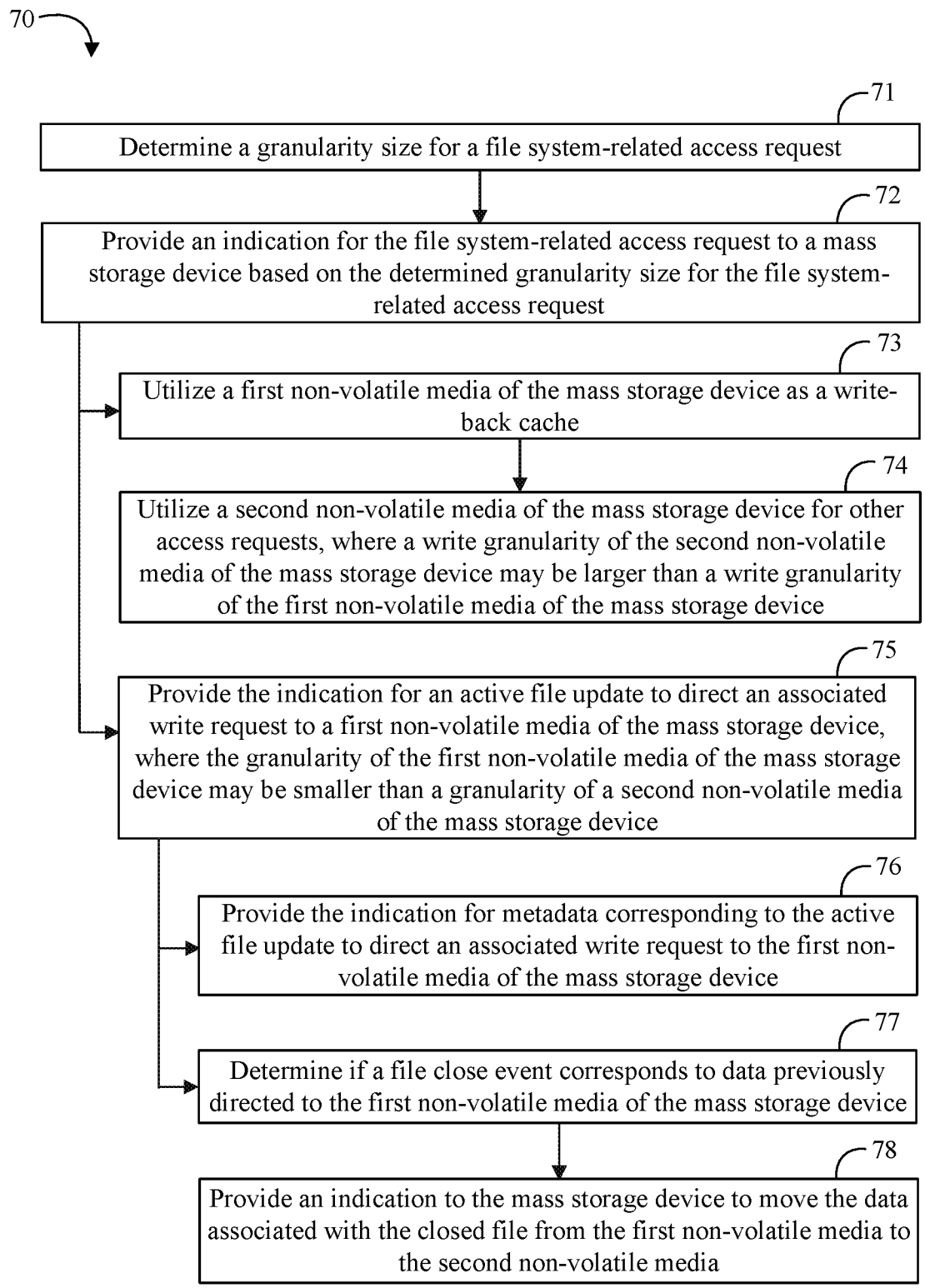
FIG. 7 is a flowchart of an example of a method of managing storage according to an embodiment.

Turning now to FIG. 7, an embodiment of a method 70 of managing storage may include determining a granularity size for a file system-related access request at block 71, and providing an indication for the file system-related access request to a mass storage device based on the determined granularity size for the file system-related access request at block 72. Some embodiments of the method 70 may include utilizing a first non-volatile media of the mass storage device as a write-back cache at block 73, and utilizing a second non-volatile media of the mass storage device for other access requests at block 74, where a write granularity of the second non-volatile media of the mass storage device may be larger than a write granularity of the first non-volatile media of the mass storage device. Additionally, or alternatively, the method 70 may include providing the indication for an active file update to direct an associated write request to a first non-volatile media of the mass storage device at block 75, where the granularity of the first non-volatile media of the mass storage device may be smaller than a granularity of a second non-volatile media of the mass storage device. For example, the method 70 may also include providing the indication for metadata corresponding to the active file update to direct an associated write request to the first non-volatile media of the mass storage device at block 76. Some embodiments of the method 70 may further include determining if a file close event corresponds to data previously directed to the first non-volatile media of the mass storage device at block 77, and providing an indication to the mass storage device to move the data associated with the closed file from the first non-volatile media to the second non-volatile media at block 78.

Embodiments of the method 70 may be implemented in a system, apparatus, computer, device, etc., for example, such as those described herein. More particularly, hardware implementations of the method 70 may include configurable logic such as, for example, PLAs, FPGAs, CPLDs, or in fixed-functionality logic hardware using circuit technology such as, for example, ASIC, CMOS, or TTL technology, or any combination thereof. Alternatively, or additionally, the method 70 may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

For example, the method 70 may be implemented on a computer readable medium as described in connection with Examples 51 to 55 below. Embodiments or portions of the method 70 may be implemented in firmware, applications (e.g., through an application programming interface (API)), or driver software running on an OS.

Some embodiments may advantageously provide a high-speed, non-volatile file update buffer. Without being limited to theory of operation, with some applications such as word processors, spreadsheets, image and audio manipulation, etc., the user may often save incremental changes. These updates may typically be only relatively few bytes in length, but for some other systems where a host computing device may be attached to a NAND-based solid-state drive (SDD), the host may write entire logical block addresses (LBAs)/sectors because that is the minimum granularity that may be written to a block based device connected to the host. The file-system may also write metadata corresponding to the user-data writes to different LBAs. In some systems, the block writes may also be smaller than internal NAND indirection granularities or page sizes. For example, a two hundred byte (200 B) user update of a file open in a word processing application may result in two discontiguous five hundred twelve byte (512 B) writes by the file-system, one for user-data and the other for the associated metadata. These two single sector writes may turn into eight kilobytes (8 KB) of read-modify-write operations inside the SSD (e.g., which may be about a forty times (40×) foreground-performance and endurance overhead in this example case, not counting the internal reads). As a user continues to modify the same file, requiring updates of the same LBAs, the net endurance penalty may multiply. Advantageously, some embodiments may provide cost-effective technology to address the foregoing problem(s).

Some other storage systems may provide byte-granularity IO to SSDs. While this may reduce the amount of data transferred over the storage interconnect bus, the byte granularity IO may not reduce the amount of IO required to the non-volatile memory (NVM). Some other storage systems may provide multiple indirection-unit (IU)-granularity SSDs and associated file-systems. Using these techniques, small file-system metadata writes may be issued to smaller IU regions and larger user-data writes may be issued to the larger IU region. Such systems may address only the overhead involved with the metadata write. Some other storage systems may provide a multi-media SSD with a hybrid file-system which may address only the overhead associated with the metadata writes, while incurring some additional cost of including both PCM and NAND media in the SSD. Outside of the field of storage systems, some OS's/file-systems may utilize volatile memory for various small granularity write-buffering/caching tasks (e.g., in DRAM). However, this may lead to data corruption or data loss in case of power-failures.

Some embodiments may advantageously extend a storage device to provide operations that allow the system to write active file updates and corresponding metadata to a small-granularity, in-place-write-capable, effectively non-volatile media inside the SSD. In some embodiments, the small-granularity media may include fast, byte-addressable non-volatile memory, such as PCM or 3D crosspoint (e.g., including INTEL 3DXPOINT memory). In some embodiments, the small-granularity media may be volatile memory such as DRAM or SRAM which is made effectively non-volatile by providing a suitable power source to maintain the contents of the small-granularity media until such contents may be transferred to other NVM (e.g., the NAND-based media of the SSD). For example, an appropriately sized capacitor may provide enough power to accommodate the transfer upon unexpected power loss. By writing active updates to the small-granularity media, some embodiments may obviate the need to write such updates to the NAND-based media upon every update, resulting in significant latency improvements and write amplification reduction. For embodiments where the small-granularity media includes a volatile store, when the user closes the file, or upon power-events, some embodiments may flush the contents of the volatile store to the non-volatile media.

Some embodiments may advantageously provide the benefits of small-granularity, fast media for user designated files. The user may experience significantly lower latencies on file-updates, and the drive lifetime may also improve. Some embodiments may be implemented in a SSD device, together with file-system extensions. For example, a hardware implementation of an embodiment of a storage device may include two effectively non-volatile media including large-granularity media (LM) and small-granularity media (SM). In some embodiments, the LM may include NAND memory devices and may also provide a large storage capacity (e.g., gigabyte (GB), terabyte (TB), etc.). In some embodiments, the SM may include a capacitor-backed DRAM, a capacitor-backed SRAM, or 3D crosspoint memory, and may generally provide a smaller storage capacity as compared to the LM. The LM may internally (e.g., natively) have a write granularity of 4 KB or 8 KB and an exposed write granularity of 512 B. The SM may have a write granularity of one (1) byte (e.g., or some other smaller granularity such as word, double word, etc.).

Some embodiments may provide file system extensions for the OS to take advantage of the structure of the storage system. For example, the OS may be aware of the two different types of media in the SSD and the OS and/or applications may be able to utilize the two different types of media accordingly. For example, some embodiments may provide the host with byte-granularity IO interface utilizing example API commands such as:

Status←WritePartial (LBA L, Offset X, Int N, Byte*pData); and
Status←ReadPartial (LBA L, Offset X, Int N, Byte*pData)

In some embodiments, the host may utilize the SM as a write-back cache of small writes. Instead of read-modify-writes to LM, for example, some embodiments may utilize the SM as a write-back cache for small writes, and for portions of large writes that are not aligned with the LM's native granularity. Other writes may be sent to the LM. Any suitable insertion/eviction cache technology, policies, and/or cacheline-size for a write-back cache may be utilized with the SM. When the SM is utilized as the write-back cache, reads need not be inserted from the LM to the SM. Writes to the LM must check for overlapping range-elements in the SM. If overlapping range-elements are found, the LM may evict/clean the overlapping range-elements as part of the LM-write. Reads must check for overlapping range-elements in the SM and, if needed, the read may perform a read-merge of data from the LM and the SM, to provide the correct data to the host. In some embodiments, the storage device may provide a hinting capability to the host (e.g., to pin data in the cache or to evict it on file-close).

In some embodiments, data may be split between the LM and the SM. For example, some embodiments may ensure that a particular LBA could either be in the LM or the SM region, but not in both. In some embodiments, the SM may be considered as a tier of data in the LM. For example, some embodiments may include information in the L2P translation table which may indicate whether the LBA is in the SM or in the LM.

Some embodiments may maintain a bit in each L2P translation table entry that indicates whether a particular IU is written to the LM or the SM region. For example, if the most significant bit of the L2P entry is '1', then the remaining bits may represent a NAND address of the LM. Otherwise, the remaining bits may represent a DRAM address of the SM. A Read or a ReadPartial command would return the data from the corresponding media. Small writes including, for example, those written with WritePartial command, may check to see if the address-range is in the SM, and if so, complete the request in the SM. Otherwise, the small write may require a read from the LM, a merge, and then a write into the SM, followed by a L2P translation table entry update to specify that the data is now in the SM (e.g., and an optional trim of that data in the LM). Large writes may be issued directly to the LM if there's no overlap of the address-range in SM, and otherwise may require a read from the SM, a merge, and a subsequent write to the LM, followed by a L2P translation table entry update to specify that the data is now in the LM.

Even though an indirection-table L2P may be used for data in the SM, no garbage collection or defragmentation may be required because in some embodiments the SM may be a write-in-place memory. The SM may only require space tracking, which in some embodiments may be implemented using a single linked list to track all the clean page addresses in the SM. If an IU is deleted or moved from the SM to the LM, the corresponding page in SM may be added into the tail of the list. If an IU is added to the SM, the storage device may allocate a new page from the head of the list. Some embodiments of splitting the data between the LM and the SM may be faster than utilizing the SM as write-back cache because splitting the data may not require a complex cache-hit/miss check on every IO, and corresponding complex insertion/eviction policies, cache-associativity policies, etc. However, some embodiments of splitting the data between the LM and the SM may provide less efficient use of the SM space (e.g., because the effective insertion granularity may be IU-size). In some embodiments, the host may still be provided with capability to hint to the storage device about insertions and evictions for the SM (e.g., so the storage device may evict SM entries on file-close).

Instead of using a bit in the L2P translation table entry, some embodiments replace the L2P entry with a token when the latest copy of data is in the SM. For example, the token may be a range of numbers which has no physical representation on the NAND of the LM, such as band 0. Advantageously, the token may not impact existing L2P technology (e.g., preferably at the bottom or top of the range of physical representations). By utilizing the token in the L2P entry, some embodiments may only need a single extra compare instead of two for every L2P lookup. The token values may map to DRAM addresses in the SM. Some embodiments may include another table with bits for each IU in the DRAM to indicate which portion is dirty and a flag if the non-dirty portion has already been read from media.

For both the technology which uses the SM as a write-back cache and the technology which splits data between the SM and the LM, embodiments of host software (e.g., file-system) may be provided to directly issue small writes to the storage device, rather than aligning the small writes to sectors, and optionally but preferably to issue an evict-hint to the storage device on file-close. Given the benefit of the present specification and drawings, other granularities and techniques to expose the SM and LM regions to the host will occur to those skilled in the art. The commands may be exposed via NVM EXPRESS (NVMe) or other protocol commands similar to the example API commands above. In some embodiments, the LM and the SM may be provided on separate devices, with suitable logic in a hardware or software controller associated with the LM and/or the SM. When the LM and the SM are provided on the same storage device (e.g., in one housing), the controller logic may also be internal to the storage device in some embodiments. Alternatively, or additionally, in some embodiments the controller logic may be placed externally (e.g., outside the housing of the storage device), with the LM and the SM exposed by the storage device to the external controller logic. For external controller logic, the storage device may also provide commands to move data between the LM and the SM more efficiently.

Figure 8:
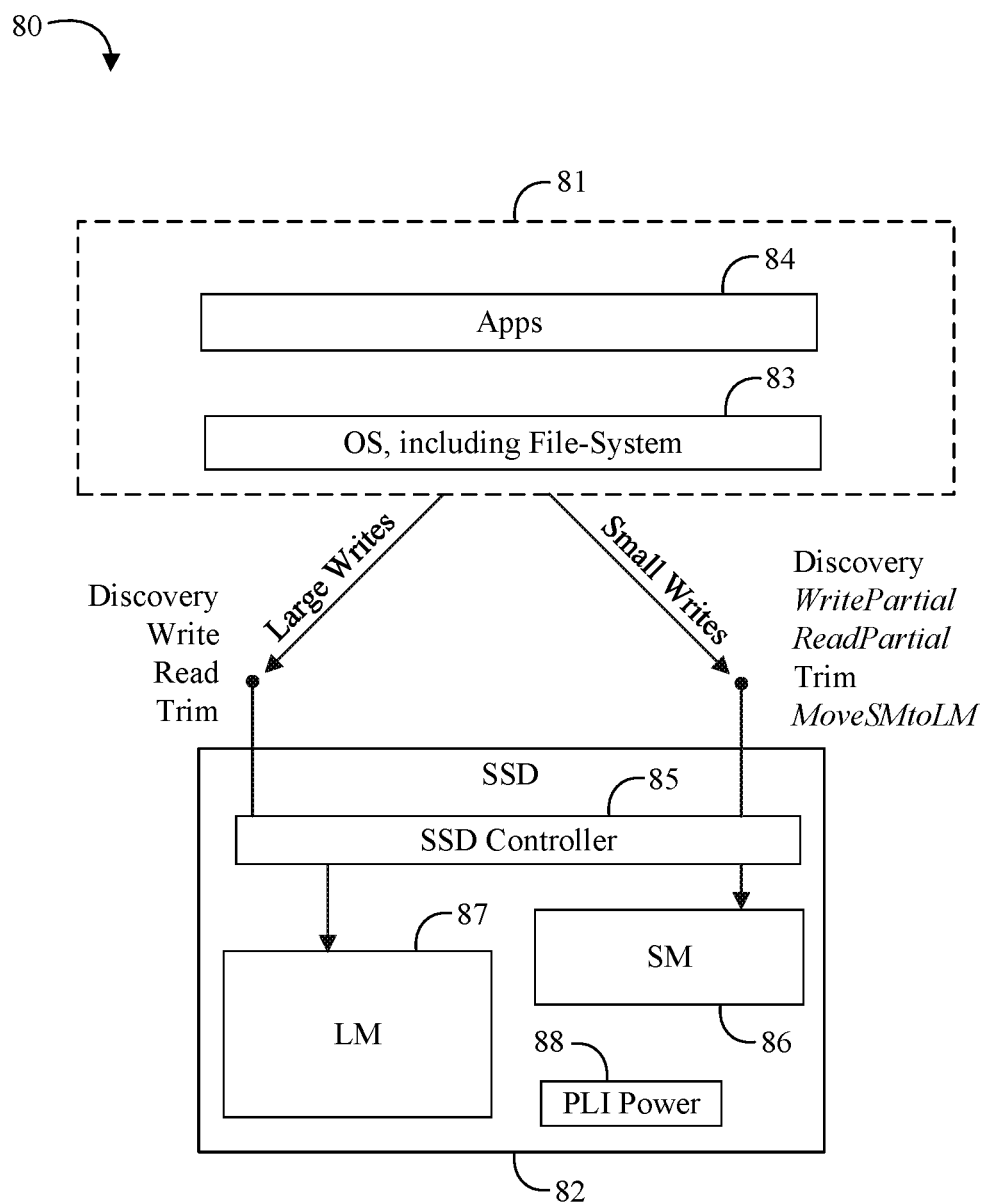
FIG. 8 is a block diagram of another example of an electronic processing system according to an embodiment.

Turning now to FIG. 8, an embodiment of an electronic processing system 80 may include a host 81 communicatively coupled to a SSD 82. The host 81 may run an OS 83, including a file system, and applications 84. The SSD 82 may include a SSD controller 85 which receives access requests from the host 81 and directs the access requests to a SM 86 and a LM 87. The SSD 82 may further include power-loss-imminent (PLI) power 88 technology (e.g., energy storing capacitors to provide power to the SSD upon unexpected power loss). In some embodiments of the system 80, the SSD 82 may expose both the LM 87 and the SM 86 to the host 81. The SSD 82 may provide a discovery, read, write, and trim interface to the LM 87. The SSD 82 may provide discovery, ReadPartial, WritePartial, trim, and MoveSMtoLM interfaces to the SM 86. For example, the two media may be exposed in the form of different namespaces or as separate devices (e.g., using multi-function device methods).

The host 81 may advantageously utilize the SM 86 for more than just file-metadata. The host may also utilize the SM 86 for all small writes to an open file, including file-contents. For example, when the host 81 is working on a high velocity file, the host 81 may choose to read/write the LBAs or bytes associated with the file to the SM 86 region. All changes and updates are targeted to the SM 86 may be completed quickly, without the need for slower non-volatile media completions. After the host 81 is done with the file, the corresponding data may be moved to the LM 87 explicitly (e.g., as described below) or implicitly (e.g., as the data in the SM 86 ages out).

For the explicit scenario, when the file is closed, in some embodiments the host 81 may transfer the corresponding writes from the SM 86 to the LM 87 via reads and writes. In some embodiments, the host 81 may alternatively utilize a move command provided by the SSD 82 to the host 81, such as MoveSMtoLM (LBA srcLBA, offset srcOffset, LBA destLBA, offset destOffset, LengthInBytes N). The MoveSMtoLM command may writes N bytes from the SM 86 to LM 87, from the specified source address (LBA and offset combination) to the specified destination address. In some embodiments, the SSD 82 may perform internal read-modify-write commands as needed to process the MoveSMtoLM command from the host 81.

In some embodiments of the system 80, large writes may be issued directly to the LM 87, while small writes may first be written to the SM 86, and then eventually be moved in the background to the LM 87. For example, depending on the media-type of the SM 86, the SSD 82 may be configured to automatically flush data from the SM 86 to the LM 87 in the background (e.g., if the data is split between the SM 86 and the LM 87), and also on power-events such as shutdown and power-failures.

ADDITIONAL NOTES AND EXAMPLES

Example 1 may include an electronic processing system, comprising a host apparatus including a host processor, host memory communicatively coupled to the host processor, and host logic communicatively coupled to the host processor, and a mass storage device communicatively coupled to the host apparatus, the mass storage device including first non-volatile media, second non-volatile media, and storage controller logic communicatively coupled to the first and second non-volatile media, wherein the second non-volatile media provides a relatively larger write granularity as compared to the first non-volatile media, wherein the host logic is to provide an indication for a file system-related access request to the mass storage device based on a granularity size for the file system-related access request, and wherein the storage controller logic is to direct an access request from the host apparatus to one of the first non-volatile media and the second non-volatile media based on the indication from the host logic.

Example 2 may include the system of Example 1, wherein the host logic is further to utilize the first non-volatile media of the mass storage device as a write-back cache.

Example 3 may include the system of Example 1, wherein the host logic is further to provide the indication for an active file update to direct an associated write request to the first non-volatile media.

Example 4 may include the system of Example 3, wherein the host logic is further to provide the indication for metadata corresponding to the active file update to direct an associated write request to the first non-volatile media.

Example 5 may include the system of Example 3, wherein the host logic is further to determine if a file close event corresponds to data previously directed to the first non-volatile media of the mass storage device, and provide an indication to the mass storage device to move the data associated with the closed file from the first non-volatile media to the second non-volatile media.

Example 6 may include the system of Example 1, wherein the storage controller logic is further to provide a byte granularity input/output interface for the first non-volatile media to an operating system of the host apparatus.

Example 7 may include the system of Example 1, wherein the storage controller logic is further to provide an indication in a logical to physical translation table based on whether the access requested is directed to the first non-volatile media or the second non-volatile media.

Example 8 may include the system of Example 1, wherein the storage controller logic is further to move data from the first non-volatile media to the second non-volatile media based on an indication from an operating system of the host apparatus.

Example 9 may include the system of Example 1, wherein the storage controller logic is further to move data from the first non-volatile media to the second non-volatile media based on an indication of a power transition.

Example 10 may include the system of any of Examples 1 to 9, wherein the first non-volatile media comprises one or more of a capacitor backed dynamic random access memory, a capacitor backed static random access memory, and a phase change memory.

Example 11 may include a mass storage apparatus, comprising first non-volatile media, second non-volatile media, wherein the second non-volatile media provides a relatively larger write granularity as compared to the first non-volatile media, and logic communicatively coupled to the first and second non-volatile media to direct an access request to one of the first non-volatile media and the second non-volatile media based on an indication from an operating system.

Example 12 may include the apparatus of Example 11, wherein the logic is further to provide a byte granularity input/output interface for the first non-volatile media to the operating system.

Example 13 may include the apparatus of Example 11, wherein the logic is further to provide an indication in a logical to physical translation table based on whether the access requested is directed to the first non-volatile media or the second non-volatile media.

Example 14 may include the apparatus of Example 11, wherein the logic is further to move data from the first non-volatile media to the second non-volatile media based on one or more of another indication from the operating system and an indication of a power transition.

Example 15 may include the apparatus of any of Examples 11 to 14, wherein the first non-volatile media comprises one or more of a capacitor backed dynamic random access memory, a capacitor backed static random access memory, and a phase change memory.

Example 16 may include a semiconductor apparatus, comprising one or more substrates, and logic coupled to the one or more substrates, wherein the logic is at least partly implemented in one or more of configurable logic and fixed-functionality hardware logic, the logic coupled to the one or more substrates to direct an access request to one of a first non-volatile media and a second non-volatile media based on an indication from an operating system.

Example 17 may include the apparatus of Example 16, wherein the logic is further to provide a byte granularity input/output interface for the first non-volatile media to the operating system.

Example 18 may include the apparatus of Example 16, wherein the logic is further to provide an indication in a logical to physical translation table based on whether the access requested is directed to the first non-volatile media or the second non-volatile media.

Example 19 may include the apparatus of Example 16, wherein the logic is further to move data from the first non-volatile media to the second non-volatile media based on one or more of an indication from the operating system and an indication of a power transition.

Example 20 may include the apparatus of any of Examples 16 to 19, wherein the logic coupled to the one or more substrates includes transistor channel regions that are positioned within the one or more substrates.

Example 21 may include a method of controlling storage, comprising determining whether an access request is directed to a first non-volatile media of a storage device or a second non-volatile media of the storage device based on an indication from an operating system, and directing the access request to one of the first non-volatile media and the second non-volatile media based on the indication from the operating system.

Example 22 may include the method of Example 21, further comprising providing a byte granularity input/output interface for the first non-volatile media to the operating system.

Example 23 may include the method of Example 21, further comprising providing an indication in a logical to physical translation table based on whether the access requested is directed to the first non-volatile media or the second non-volatile media.

Example 24 may include the method of Example 21, further comprising moving data from the first non-volatile media to the second non-volatile media based on one or more of another indication from the operating system and an indication of a power transition.

Example 25 may include the method of any of Examples 21 to 24, wherein the first non-volatile media comprises one or more of a capacitor backed dynamic random access memory, a capacitor backed static random access memory, and a phase change memory.

Example 26 may include at least one computer readable medium, comprising a set of instructions, which when executed by a computing device, cause the computing device to determine whether an access request is directed to a first non-volatile media of a storage device or a second non-volatile media of the storage device based on an indication from an operating system, and direct the access request to one of the first non-volatile media and the second non-volatile media based on the indication from the operating system.

Example 27 may include the at least one computer readable medium of Example 26, comprising a further set of instructions, which when executed by the computing device, cause the computing device to provide a byte granularity input/output interface for the first non-volatile media to the operating system.

Example 28 may include the at least one computer readable medium of Example 26, comprising a further set of instructions, which when executed by the computing device, cause the computing device to provide an indication in a logical to physical translation table based on whether the access requested is directed to the first non-volatile media or the second non-volatile media.

Example 29 may include the at least one computer readable medium of Example 26, comprising a further set of instructions, which when executed by the computing device, cause the computing device to move data from the first non-volatile media to the second non-volatile media based on one or more of another indication from the operating system and an indication of a power transition.

Example 30 may include the at least one computer readable medium of any of Examples 26 to 29, wherein the first non-volatile media comprises one or more of a capacitor backed dynamic random access memory, a capacitor backed static random access memory, and a phase change memory.

Example 31 may include a storage controller apparatus, comprising means for determining whether an access request is directed to a first non-volatile media of a storage device or a second non-volatile media of the storage device based on an indication from an operating system, and means for directing the access request to one of the first non-volatile media and the second non-volatile media based on the indication from the operating system.

Example 32 may include the apparatus of Example 31, further comprising means for providing a byte granularity input/output interface for the first non-volatile media to the operating system.

Example 33 may include the apparatus of Example 31, further comprising means for providing an indication in a logical to physical translation table based on whether the access requested is directed to the first non-volatile media or the second non-volatile media.

Example 34 may include the apparatus of Example 31, further comprising means for moving data from the first non-volatile media to the second non-volatile media based on one or more of another indication from the operating system and an indication of a power transition.

Example 35 may include the apparatus of any of Examples 31 to 34, wherein the first non-volatile media comprises one or more of a capacitor backed dynamic random access memory, a capacitor backed static random access memory, and a phase change memory.

Example 36 may include a host computing apparatus, comprising a processor, memory communicatively coupled to the processor, and logic communicatively coupled to the processor to provide an indication for a file system-related access request to a mass storage device based on a granularity size for the file system-related access request.

Example 37 may include the apparatus of Example 36, wherein the logic is further to utilize a first non-volatile media of the mass storage device as a write-back cache, and utilize a second non-volatile media of the mass storage device for other access requests, wherein a write granularity of the second non-volatile media of the mass storage device is larger than a write granularity of the first non-volatile media of the mass storage device.

Example 38 may include the apparatus of Example 36, wherein the logic is further to provide the indication for an active file update to direct an associated write request to a first non-volatile media of the mass storage device, wherein a granularity of the first non-volatile media of the mass storage device is smaller than a granularity of a second non-volatile media of the mass storage device.

Example 39 may include the apparatus of Example 38, wherein the logic is further to provide the indication for metadata corresponding to the active file update to direct an associated write request to the first non-volatile media of the mass storage device.

Example 40 may include the apparatus of Example 38, wherein the logic is further to determine if a file close event corresponds to data previously directed to the first non-volatile media of the mass storage device, and provide an indication to the mass storage device to move the data associated with the closed file from the first non-volatile media to the second non-volatile media.

Example 41 may include a semiconductor apparatus, comprising one or more substrates, and logic coupled to the one or more substrates, wherein the logic is at least partly implemented in one or more of configurable logic and fixed-functionality hardware logic, the logic coupled to the one or more substrates to provide an indication for a file system-related access request to a mass storage device based on a granularity size for the file system-related access request.

Example 42 may include the apparatus of Example 41, wherein the logic is further to utilize a first non-volatile media of the mass storage device as a write-back cache, and utilize a second non-volatile media of the mass storage device for other access requests, wherein a write granularity of the second non-volatile media of the mass storage device is larger than a write granularity of the first non-volatile media of the mass storage device.

Example 43 may include the apparatus of Example 41, wherein the logic is further to provide the indication for an active file update to direct an associated write request to a first non-volatile media of the mass storage device, wherein a granularity of the first non-volatile media of the mass storage device is smaller than a granularity of a second non-volatile media of the mass storage device.

Example 44 may include the apparatus of Example 43, wherein the logic is further to provide the indication for metadata corresponding to the active file update to direct an associated write request to the first non-volatile media of the mass storage device.

Example 45 may include the apparatus of Example 43, wherein the logic is further to determine if a file close event corresponds to data previously directed to the first non-volatile media of the mass storage device, and provide an indication to the mass storage device to move the data associated with the closed file from the first non-volatile media to the second non-volatile media.

Example 46 may include a method of managing storage, comprising determining a granularity size for a file system-related access request, and providing an indication for the file system-related access request to a mass storage device based on the determined granularity size for the file system-related access request.

Example 47 may include the method of Example 46, further comprising utilizing a first non-volatile media of the mass storage device as a write-back cache, and utilizing a second non-volatile media of the mass storage device for other access requests, wherein a write granularity of the second non-volatile media of the mass storage device is larger than a write granularity of the first non-volatile media of the mass storage device.

Example 48 may include the method of Example 46, further comprising providing the indication for an active file update to direct an associated write request to a first non-volatile media of the mass storage device, wherein a granularity of the first non-volatile media of the mass storage device is smaller than a granularity of a second non-volatile media of the mass storage device.

Example 49 may include the method of Example 48, further comprising providing the indication for metadata corresponding to the active file update to direct an associated write request to the first non-volatile media of the mass storage device.

Example 50 may include the method of Example 48, further comprising determining if a file close event corresponds to data previously directed to the first non-volatile media of the mass storage device, and providing an indication to the mass storage device to move the data associated with the closed file from the first non-volatile media to the second non-volatile media.

Example 51 may include at least one computer readable medium, comprising a set of instructions, which when executed by a computing device, cause the computing device to determine a granularity size for a file system-related access request, and provide an indication for the file system-related access request to a mass storage device based on the determined granularity size for the file system-related access request.

Example 52 may include the at least one computer readable medium of Example 51, comprising a further set of instructions, which when executed by the computing device, cause the computing device to utilize a first non-volatile media of the mass storage device as a write-back cache, and utilize a second non-volatile media of the mass storage device for other access requests, wherein a write granularity of the second non-volatile media of the mass storage device is larger than a write granularity of the first non-volatile media of the mass storage device.

Example 53 may include the at least one computer readable medium of Example 51, comprising a further set of instructions, which when executed by the computing device, cause the computing device to provide the indication for an active file update to direct an associated write request to a first non-volatile media of the mass storage device, wherein a granularity of the first non-volatile media of the mass storage device is smaller than a granularity of a second non-volatile media of the mass storage device.

Example 54 may include the at least one computer readable medium of Example 53, comprising a further set of instructions, which when executed by the computing device, cause the computing device to provide the indication for metadata corresponding to the active file update to direct an associated write request to the first non-volatile media of the mass storage device.

Example 55 may include the at least one computer readable medium of Example 53, comprising a further set of instructions, which when executed by the computing device, cause the computing device to determine if a file close event corresponds to data previously directed to the first non-volatile media of the mass storage device, and provide an indication to the mass storage device to move the data associated with the closed file from the first non-volatile media to the second non-volatile media.

Example 56 may include a storage manager apparatus, comprising means for determining a granularity size for a file system-related access request, and means for providing an indication for the file system-related access request to a mass storage device based on the determined granularity size for the file system-related access request.

Example 57 may include the apparatus of Example 56, further comprising means for utilizing a first non-volatile media of the mass storage device as a write-back cache, and means for utilizing a second non-volatile media of the mass storage device for other access requests, wherein a write granularity of the second non-volatile media of the mass storage device is larger than a write granularity of the first non-volatile media of the mass storage device.

Example 58 may include the apparatus of Example 56, further comprising means for providing the indication for an active file update to direct an associated write request to a first non-volatile media of the mass storage device, wherein a granularity of the first non-volatile media of the mass storage device is smaller than a granularity of a second non-volatile media of the mass storage device.

Example 59 may include the apparatus of Example 58, further comprising means for providing the indication for metadata corresponding to the active file update to direct an associated write request to the first non-volatile media of the mass storage device.

Example 60 may include the apparatus of Example 58, further comprising means for determining if a file close event corresponds to data previously directed to the first non-volatile media of the mass storage device, and means for providing an indication to the mass storage device to move the data associated with the closed file from the first non-volatile media to the second non-volatile media.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrase "one or more of A, B, and C" and the phrase "one or more of A, B, or C" both may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. An electronic processing system, comprising:
a host apparatus including a host processor, host memory communicatively coupled to the host processor, and host logic communicatively coupled to the host processor; and
a mass storage device communicatively coupled to the host apparatus, the mass storage device including first non-volatile media, second non-volatile media, and storage controller logic communicatively coupled to the first and second non-volatile media, wherein the second non-volatile media provides a relatively larger write granularity as compared to the first non-volatile media,
wherein the host logic is to provide an indication for a file system-related access request to the mass storage device based on a granularity size for the file system-related access request,
wherein the storage controller logic is to direct an access request from the host apparatus to one of the first non-volatile media and the second non-volatile media based on the indication from the host logic in response to a granularity size of the file system-related access request,
wherein the storage controller logic is to provide the indication for an active file update to direct an associated write request to the first non-volatile media,
wherein the storage controller logic is to determine if a file close event corresponds to data previously directed to the first non-volatile media of the mass storage device, and
wherein the host logic is further to provide an indication to the mass storage device to move data associated with a closed file from the first non-volatile media to the second non-volatile media, wherein the indication to move the data associated with the closed file is provided in response to the determination that the file close event corresponds to data previously directed to the first non-volatile media of the mass storage device.

2. The system of claim 1, wherein the host logic is further to:
utilize the first non-volatile media of the mass storage device as a write-back cache.

3. The system of claim 1, wherein the host logic is further to:
provide the indication for metadata corresponding to the active file update to direct an associated write request to the first non-volatile media.

4. The system of claim 1, wherein the storage controller logic is further to:
provide a byte granularity input/output interface for the first non-volatile media to an operating system of the host apparatus.

5. The system of claim 1, wherein the storage controller logic is further to:
provide an indication in a logical to physical translation table based on whether the access requested is directed to the first non-volatile media or the second non-volatile media.

6. The system of claim 1, wherein the storage controller logic is further to:
move data from the first non-volatile media to the second non-volatile media based on an indication from an operating system of the host apparatus.

7. The system of claim 1, wherein the storage controller logic is further to:
move data from the first non-volatile media to the second non-volatile media based on an indication of a power transition.

8. The system of claim 1, wherein the first non-volatile media comprises one or more of a capacitor backed dynamic random access memory, a capacitor backed static random access memory, and a phase change memory.

9. A mass storage apparatus, comprising:
first non-volatile media;
second non-volatile media, wherein the second non-volatile media provides a relatively larger write granularity as compared to the first non-volatile media; and
logic communicatively coupled to the first and second non-volatile media to:
direct an access request to one of the first non-volatile media and the second non-volatile media based on an indication from an operating system in response to a granularity size of the access request,
provide the indication for an active file update to direct an associated write request to the first non-volatile media,
determine if a file close event corresponds to data previously directed to the first non-volatile media of the mass storage device, and
move data from the first non-volatile media to the second non-volatile media based on another indication from the operating system, wherein the indication to move the data associated with the closed file is provided in response to the determination that the file close event corresponds to data previously directed to the first non-volatile media of the mass storage device.

10. The apparatus of claim 9, wherein the logic is further to:
provide a byte granularity input/output interface for the first non-volatile media to the operating system.

11. The apparatus of claim 9, wherein the logic is further to:
provide an indication in a logical to physical translation table based on whether the access requested is directed to the first non-volatile media or the second non-volatile media.

12. The apparatus of claim 9, wherein the logic is further to:
move data from the first non-volatile media to the second non-volatile media based on an indication of a power transition.

13. The apparatus of claim 9, wherein the first non-volatile media comprises one or more of a capacitor backed dynamic random access memory, a capacitor backed static random access memory, and a phase change memory.

14. A semiconductor apparatus, comprising:
one or more substrates; and
logic coupled to the one or more substrates, wherein the logic is at least partly implemented in one or more of configurable logic and fixed-functionality hardware logic, the logic coupled to the one or more substrates to:
direct an access request to one of a first non-volatile media and a second non-volatile media based on an indication from an operating system in response to a granularity size of the access request,
provide the indication for an active file update to direct an associated write request to the first non-volatile media,
determine if a file close event corresponds to data previously directed to the first non-volatile media of the mass storage device, and
move data from the first non-volatile media to the second non-volatile media based on another indication from the operating system, wherein the indication to move the data associated with the closed file is provided in response to the determination that the file close event corresponds to data previously directed to the first non-volatile media of the mass storage device.

15. The apparatus of claim 14, wherein the logic is further to:
provide a byte granularity input/output interface for the first non-volatile media to the operating system.

16. The apparatus of claim 14, wherein the logic is further to:
provide an indication in a logical to physical translation table based on whether the access requested is directed to the first non-volatile media or the second non-volatile media.

17. The apparatus of claim 14, wherein the logic is further to:
move data from the first non-volatile media to the second non-volatile media based on an indication of a power transition.

18. The apparatus of claim 14, wherein the logic coupled to the one or more substrates includes transistor channel regions that are positioned within the one or more substrates.

19. A method of controlling storage, comprising:
determining whether an access request is directed to a first non-volatile media of a storage device or a second non-volatile media of the storage device based on an indication from an operating system; and
directing the access request to one of the first non-volatile media and the second non-volatile media based on the indication from the operating system in response to a granularity size of the access request,
providing the indication for an active file update to direct an associated write request to the first non-volatile media,
determining if a file close event corresponds to data previously directed to the first non-volatile media of the mass storage device, and
moving data from the first non-volatile media to the second non-volatile media based on another indication from the operating system, wherein the indication to move the data associated with the closed file is provided in response to the determination that the file close event corresponds to data previously directed to the first non-volatile media of the mass storage device.

20. The method of claim 19, further comprising:
providing a byte granularity input/output interface for the first non-volatile media to the operating system.

21. The method of claim 19, further comprising:
providing an indication in a logical to physical translation table based on whether the access requested is directed to the first non-volatile media or the second non-volatile media.

22. The method of claim 19, further comprising:
moving data from the first non-volatile media to the second non-volatile media based on an indication of a power transition.

23. The method of claim 19, wherein the first non-volatile media comprises one or more of a capacitor backed dynamic random access memory, a capacitor backed static random access memory, and a phase change memory.

\* \* \* \* \*